United States Patent
Cheng

(10) Patent No.: US 10,421,222 B2
(45) Date of Patent: Sep. 24, 2019

(54) METHOD FOR MANUFACTURING A WATERTIGHT ZIPPER

(71) Applicant: UNITECH ZIPPER & MACHINERY CO., LTD., New Taipei (TW)

(72) Inventor: Jung-Yuan Cheng, New Taipei (TW)

(73) Assignee: Unitech Zipper & Machinery Co., Ltd., New Taipei (TW)

( * ) Notice: Subject to any disclaimer, the term of this patent is extended or adjusted under 35 U.S.C. 154(b) by 952 days.

(21) Appl. No.: 14/969,000

(22) Filed: Dec. 15, 2015

(65) Prior Publication Data

US 2017/0113384 A1    Apr. 27, 2017

(30) Foreign Application Priority Data

Oct. 22, 2015   (TW) .............................. 104134674 A

(51) Int. Cl.
| | |
|---|---|
| *B29C 45/14* | (2006.01) |
| *A44B 19/32* | (2006.01) |
| *B29L 5/00* | (2006.01) |
| *A44B 19/06* | (2006.01) |
| *A44B 19/34* | (2006.01) |
| *B29C 45/16* | (2006.01) |

(52) U.S. Cl.
CPC ........ *B29C 45/14344* (2013.01); *A44B 19/06* (2013.01); *A44B 19/32* (2013.01); *A44B 19/34* (2013.01); *B29C 45/14336* (2013.01); *B29C 45/1671* (2013.01); *B29C 45/14573* (2013.01); *B29C 2045/14368* (2013.01); *B29L 2005/00* (2013.01)

(58) Field of Classification Search
None
See application file for complete search history.

(56) References Cited

U.S. PATENT DOCUMENTS

| | | |
|---|---|---|
| 2,910,754 A | 11/1959 | Morin |
| 4,765,038 A | 8/1988 | Kasai |
| 7,870,649 B2 | 1/2011 | Mikuma et al. |
| 9,295,307 B2 * | 3/2016 | Tominaga .............. A44B 19/32 |
| 2007/0245529 A1 | 10/2007 | Stewart |

FOREIGN PATENT DOCUMENTS

| | | | |
|---|---|---|---|
| TW | 200624052 A | 7/2006 | |
| TW | I339106 B | 3/2011 | |
| WO | WO-2012020492 A1 * | 2/2012 | ............ A44B 19/32 |

* cited by examiner

*Primary Examiner* — Benjamin A Schiffman
(74) *Attorney, Agent, or Firm* — Alan D. Kamrath; Mayer & Williams PC

(57) ABSTRACT

A method for manufacturing a watertight zipper solves the problem of low watertight effect of the modern watertight zipper. The method includes producing a waterproof stringer tape and forming a waterproof layer by injection molding. The waterproof layer covers a lateral edge of the waterproof stringer tape and includes a plurality of recesses. The method for manufacturing the watertight zipper further includes forming an aperture in each of the plurality of recesses. The aperture extends through the waterproof layer and the waterproof stringer tape. The method for manufacturing the watertight zipper further includes forming a plurality of scoops in the plurality of recesses by injection molding.

11 Claims, 12 Drawing Sheets

METHOD FOR MANUFACTURING A WATERTIGHT ZIPPER

CROSS REFERENCE TO RELATED APPLICATIONS

The application claims the benefit of Taiwan application serial No. 104134674, filed on Oct. 22, 2015, and the subject matter of which is incorporated herein by reference.

BACKGROUND OF THE INVENTION

1. Field of the Invention

The present invention generally relates to a method for manufacturing a zipper and, more particularly, to a method for manufacturing a watertight zipper that can effectively prevent the penetration of liquid.

2. Description of the Related Art

FIGS. 1 and 2 show a watertight zipper 9 manufactured according to a convention method. In such a method, a stringer tape 91 is coated with a resilient material to form a covering layer 92. Then, a plurality of apertures 93 is arranged on the stringer tape 91 and the covering layer 92 in even intervals. Finally, an injection molding is performed to bond a scoop 94 to the stringer tape 91 via a corresponding aperture 93. The scoop 94 includes an upper scoop portion and a lower scoop portion that are interconnected via a corresponding aperture 93. When the left and right scoops 94 are engaged with each other, the covering layers 92 of the left and right scoop portions may be firmly pressed against each other. As a result, the liquid is not able to penetrate the watertight zipper 9 from between the left and right scoop portions. Such a conventional manufacturing method can be seen in Taiwan Patent No. I339106.

In the conventional manufacturing method of the watertight zipper 9, a thermoplastic material is heated to a molten state, and the molten material is applied to the surfaces of the stringer tape 91 by extrusion. As such, the extruded molten material will form the covering layer 92 after cooling and solidification. However, the extrusion of the molten material will cause expansion of the thermoplastic material. Thus, the extruded molten material on the stringer tape 91 will have uneven expansion and shrinkage. As a result, the lateral edge 921 of the covering layer 92 is not even, such that the lateral edges 921 of the covering layer 92 cannot be in complete abutment without interstice when the left and right scoop portions are engaged with each other. Disadvantageously, liquid will slowly penetrate the watertight zipper 9 from between the left and right scoop portions.

Furthermore, the aperture 93 is in a circular form, and the upper and lower scoop portions of the scoop 94 are bonded together merely through the plastic material in the aperture 93. In this structure, if the scoop 94 is not properly combined with the molten material of the covering layer 92, the positioning of the scoop 94 will be disturbed by the pulling force operating the watertight zipper 9. As such, the operation of the watertight zipper 9 is not smooth.

Another type of the conventional watertight zipper can be seen in U.S. Pat. No. 2,910,754.

In light of this, it is necessary to improve the conventional manufacturing method of the watertight zipper.

SUMMARY OF THE INVENTION

It is therefore the objective of the invention to provide a method for manufacturing a watertight zipper which forms a waterproof layer by injection molding. The waterproof layer includes a lateral portion having an edge in a flat form.

It is another objective of the invention to provide a method for manufacturing a watertight zipper having a plurality of scoops which is fixed and does not rotate.

In an embodiment, a method for manufacturing a watertight zipper includes producing a waterproof stringer tape and forming a waterproof layer by injection molding. The waterproof layer covers a lateral edge of the waterproof stringer tape and includes a plurality of recesses. The method for manufacturing the watertight zipper further includes forming an aperture in each of the plurality of recesses. Each aperture extends through the waterproof layer and the waterproof stringer tape. The method for manufacturing the watertight zipper further includes forming a plurality of scoops in the plurality of recesses by injection molding. Each of the plurality of scoops includes an upper scoop portion and a lower scoop portion that are interconnected via the aperture.

In a form shown, the waterproof layer includes a top portion, a bottom portion, and a lateral portion connected between the top portion and the bottom portion. The top portion is connected to a top face of the waterproof stringer tape and the upper scoop portion, the bottom portion is connected to a bottom face of the waterproof stringer tape and the lower scoop portion, and the lateral portion comprises an edge that is in an even form. The plurality of recesses is arranged on the top portion or the bottom portion of the waterproof layer.

In another embodiment, a method for manufacturing a watertight zipper includes producing a waterproof stringer tape from a tape having a cord portion and forming a waterproof layer by injection molding. The waterproof layer covers a lateral edge of the waterproof stringer tape and the cord portion and includes a plurality of recesses arranged on the cord portion. The plurality of recesses extends beyond an outer end of the cord portion. The method for manufacturing the watertight zipper further includes forming a plurality of scoops in the plurality of recesses by injection molding. Each of the plurality of scoops includes an upper scoop portion and a lower scoop portion that are interconnected via a respective one of the plurality of recesses.

In a form shown, the method for manufacturing the watertight zipper further comprises forming an aperture in each of the plurality of recesses before the plurality of scoops is formed. As such, the upper scoop portion and the lower scoop portion can have larger interconnected parts.

In the form shown, the waterproof layer includes a top portion, a bottom portion, and a lateral portion connected between the top portion and the bottom portion. The top portion is connected to a top face of the waterproof stringer tape and the upper scoop portion, the bottom portion is connected to a bottom face of the waterproof stringer tape and the lower scoop portion, and the lateral portion is located outwardly of the outer end of the cord portion and includes an edge that is in an even form. The plurality of recesses is arranged on the top portion or the bottom portion of the waterproof layer.

Based on this, it can be ensured that an edge of the lateral portion of the waterproof layer is flat and does not form any irregular face. As such, when two waterproof stringer tapes are combined with each other, the edges of the lateral portions of the left and right waterproof layers can be firmly pressed against each other without interstice. Advantageously, the liquid will not be able to leak from between the left and right scoops, attaining an excellent watertight effect.

Furthermore, the method for manufacturing the watertight zipper according to either embodiment of the invention is able to provide a secure engagement between the scoops and the waterproof stringer tape, thereby improving the convenience in operating the watertight zipper as well as improving the durability of the watertight zipper.

In the structure, the plurality of recesses extends beyond an inner end of the cord portion opposite to the outer end of the cord portion in order to increase the area of the scoop covering the waterproof stringer tape. Thus, the engaging effect between the scoop and the waterproof stringer tape is reinforced.

Furthermore, the plurality of recesses includes a plurality of first recesses arranged on the top portion of the waterproof layer, as well as a plurality of second recesses arranged on the bottom portion of the waterproof layer. Each of the plurality of first recesses is aligned with a respective one of the plurality of second recesses. Thus, the corresponding first and second recesses are able to provide a reinforced positioning effect for a scoop.

In the form shown, producing the waterproof stringer tape includes adhering a waterproof film to a surface of the stringer tape.

In another form shown, producing the waterproof stringer tape includes adhering two waterproof films to the top and bottom surfaces of the stringer tape. As such, the engaging effect between the waterproof films and the waterproof stringer tape is improved, such that the waterproof films will not easily disengage from the waterproof stringer tape after a long time of use. Accordingly, the service life of the waterproof stringer tape is prolonged.

In the other form shown, the method for manufacturing the watertight zipper further includes producing another waterproof stringer tape to be engaged with the waterproof stringer tape and forming another waterproof layer by injection molding. The other waterproof layer covers a lateral edge of the other waterproof stringer tape. Both the waterproof layer and the other waterproof layer include a lateral portion, and the two lateral portions of the two waterproof layers include two edges that are in corresponding shapes. An interface between the two edges has a plurality of interconnected sections extending in different directions. In this arrangement, although liquid penetrates the watertight zipper from one side, the liquid cannot easily reach the other side of the watertight zipper. Therefore, the waterproof layer has a larger permissible tolerance in size.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
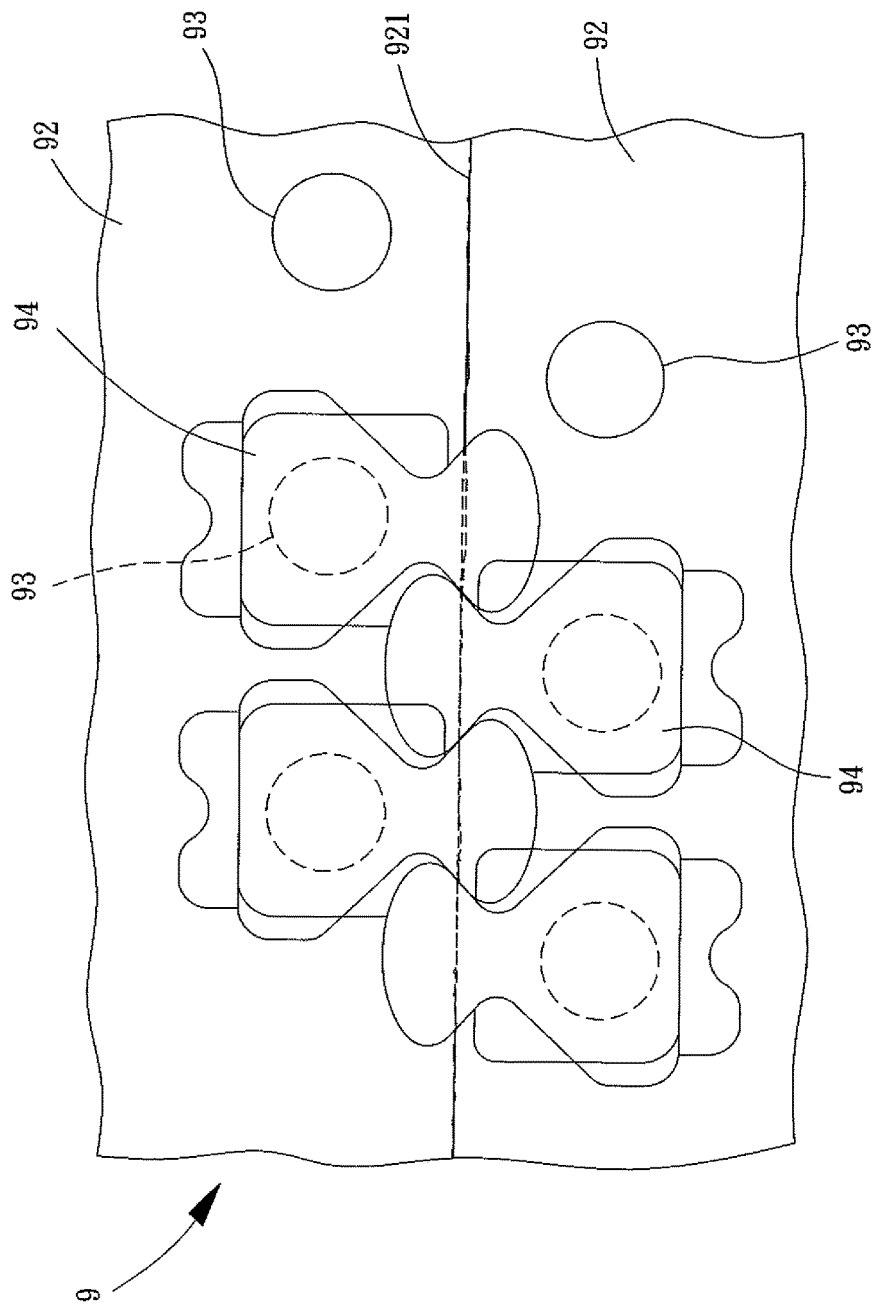
FIG. 1 is a top view of a conventional watertight zipper.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The method for manufacturing a watertight zipper according to a first embodiment of the invention includes the steps as described below.

Figure 2:
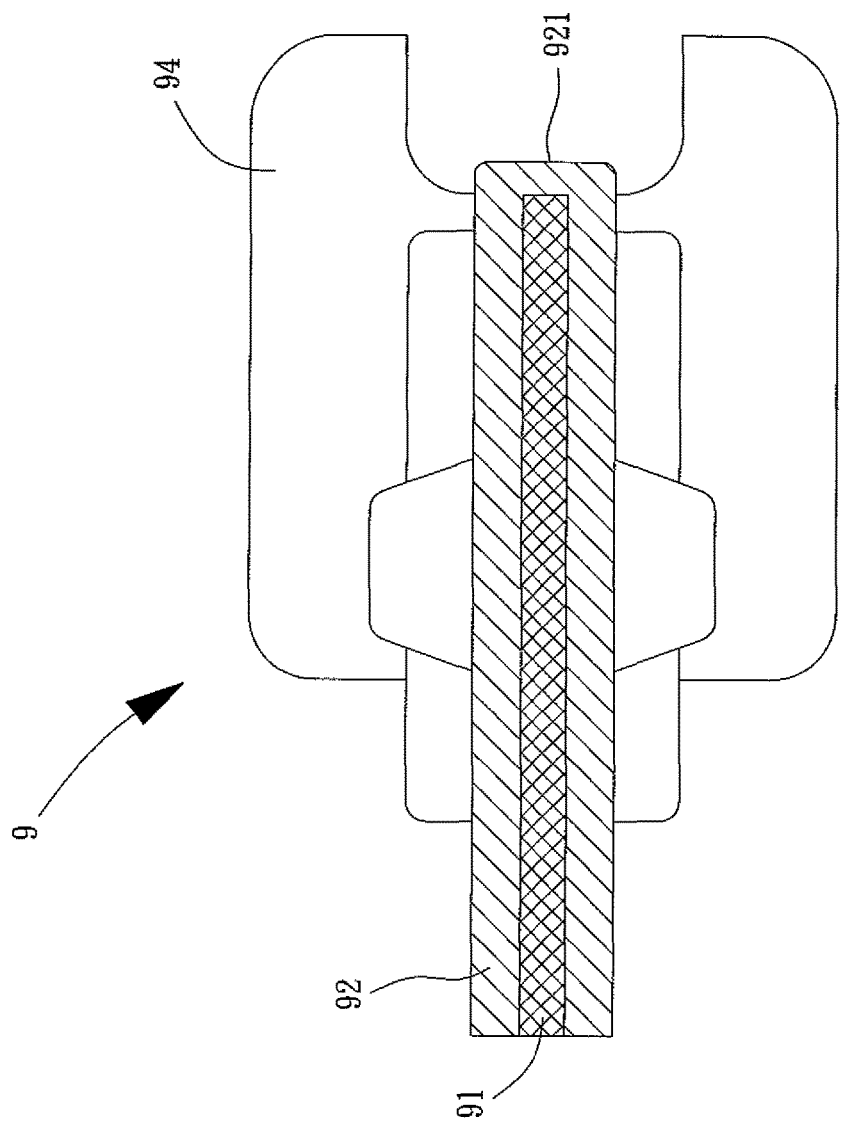
FIG. 2 is a cross sectional view of the conventional watertight zipper.
Figure 3:
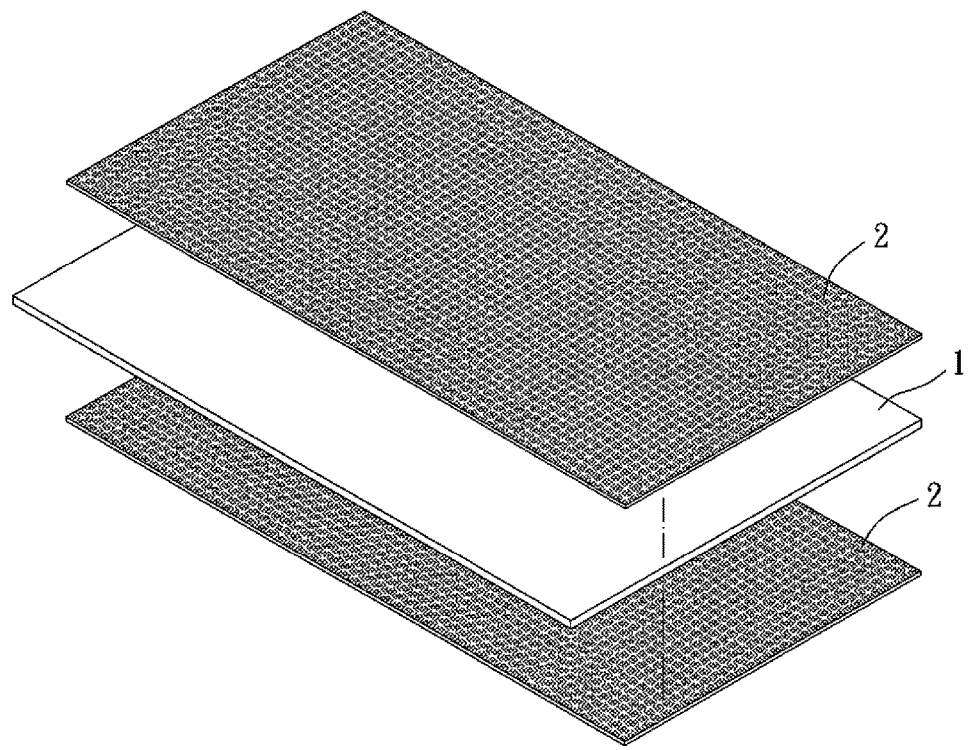
FIG. 3 shows a stringer tape to be coupled with two waterproof films at two sides thereof according to a watertight zipper of a first embodiment of the invention.

First, a waterproof stringer tape is provided where liquid is not able to penetrate the waterproof stringer tape. The manufacturing method of the waterproof stringer tape is not limited thereto. As an example of FIG. 3, the waterproof stringer tape may be formed by adhering at least one waterproof film 2 to at least one surface of a tape 1. In a preferred case, each of the upper and lower surfaces of the tape 1 (as rendered according to the orientation of the watertight zipper in FIG. 2) is provided with a waterproof film 2. In another embodiment, a waterproof gel may be applied to the at least one surface of the tape 1. Alternatively, pressure may be applied to force the waterproof gel into the tape 1 (to be absorbed by the tape 1), thus achieving the waterproof effect of the tape 1. In a further embodiment, a thermoplastic material may be heated to a molten state, and the molten material is applied to two surfaces of the tape 1 by extrusion. Since the extruded molten material has uneven expansion and shrinkage on the tape 1, the tape 1 may be cut by a cutting tool. This also provides the same effect of adhering two waterproof films 2 on the two surfaces of the tape 1.

Figure 4:
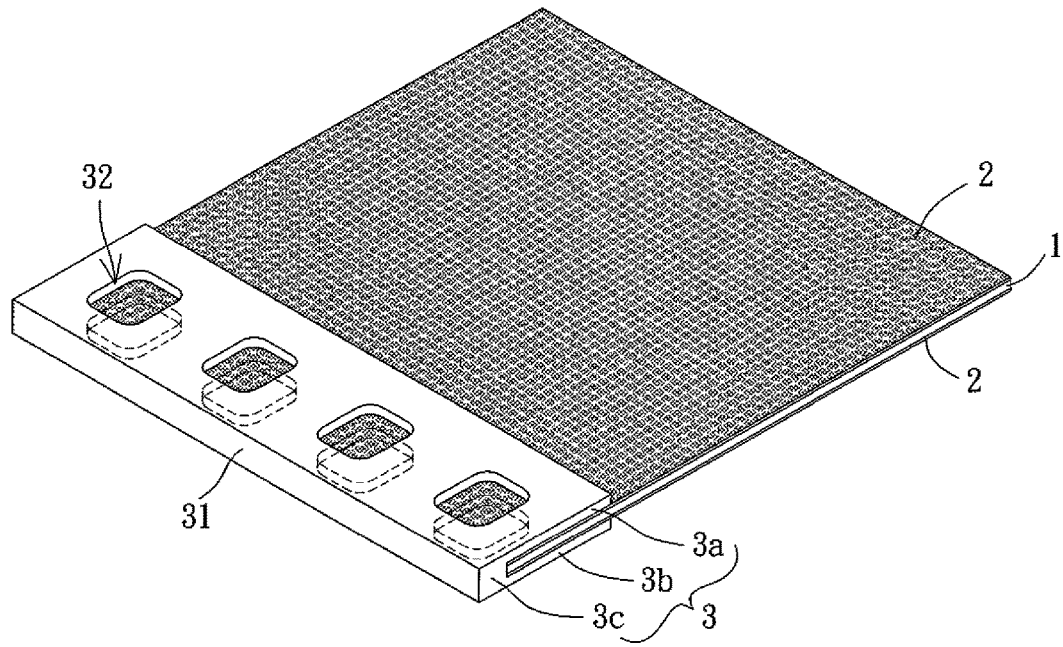
FIG. 4 shows a waterproof layer formed with the stringer tape and the two waterproof films by injection molding according to the watertight zipper of the first embodiment of the invention.

Referring to FIG. 4, a waterproof layer 3 is formed by injection molding, and the waterproof layer 3 covers one lateral edge of the waterproof stringer tape. Specifically, the waterproof stringer tape may be placed in a mold of an injection molding machine, and molten polymeric material (such as TPU or TPE) is injected into the cavity of the mold. After the polymeric material solidifies, the mold is removed, and the waterproof stringer tape having the waterproof layer 3 is obtained.

Based on this, when the waterproof stringer tape is obtained, the waterproof layer 3 is able to securely couple with one lateral edge of the waterproof stringer tape. The waterproof layer 3 includes a top portion 3a, a bottom portion 3b and a lateral portion 3c. The top portion 3a is bonded to a top face of the waterproof stringer tape, the bottom portion 3b is bonded to a bottom face of the waterproof stringer tape, and the lateral portion 3c is connected between the top portion 3a and the bottom portion 3b. In this structure, it can be ensured that the edge 31 of the lateral portion 3c is in an even form as desired (in the embodiment, the edge 31 of the lateral portion 3c is in a flat form). As such, the edge 31 of the lateral portion 3c will not form an irregular surface due to uneven cooling and shrinking effects.

In the above, the waterproof layer 3 and the waterproof film 2 can be made of the same or similar material. Thus, the coupling effect between the waterproof layer 3 and the waterproof film 2 will be better than that between the waterproof layer 3 and the stringer tape 1. Therefore, when both the top and bottom surfaces of the stringer tape 1 are provided with a waterproof film 2, the coupling effect between the waterproof layer 3 and the waterproof stringer tape will be better as compared with only one waterproof film 2 coupled with only one surface of the stringer tape 1. In this structure, the waterproof layer 3 will not easily disengage from the waterproof stringer tape after a long time of use, thereby prolonging the service life of the watertight zipper.

The waterproof layer 3 further includes a plurality of recesses 32. Each of the plurality of recesses 32 may extend from one face of the top portion 3a through another face of the top portion 3a, so that the surface of the waterproof stringer tape is exposed via the recess 32 as shown in FIG. 4. Alternatively, each of the plurality of recesses 32 may also extend from one face of the top portion 3a towards but spaced from another face of the top portion 3a, such that the surface of the waterproof stringer tape is not exposed via the recess 32. However, the arrangement of the plurality of recesses 32 will not affect the positioning of the plurality of scoops regardless of which option is used (which will be described later). Each of the plurality of recesses 32 may be in a non-circular form. Alternatively, various shapes of the recesses 32 may be provided when each scoop is formed. This also prevents disturbing the positioning of the plurality of scoops. The plurality of recesses 32 may also be arranged on both the top portion 3a and the bottom portion 3b in a manner that the recesses 32 on the top portion 3a correspond to the recesses 32 on the bottom portion 3b. As such, a corresponding pair of the recesses 32 will be able to provide an improved positioning effect for a single scoop.

Figure 5:
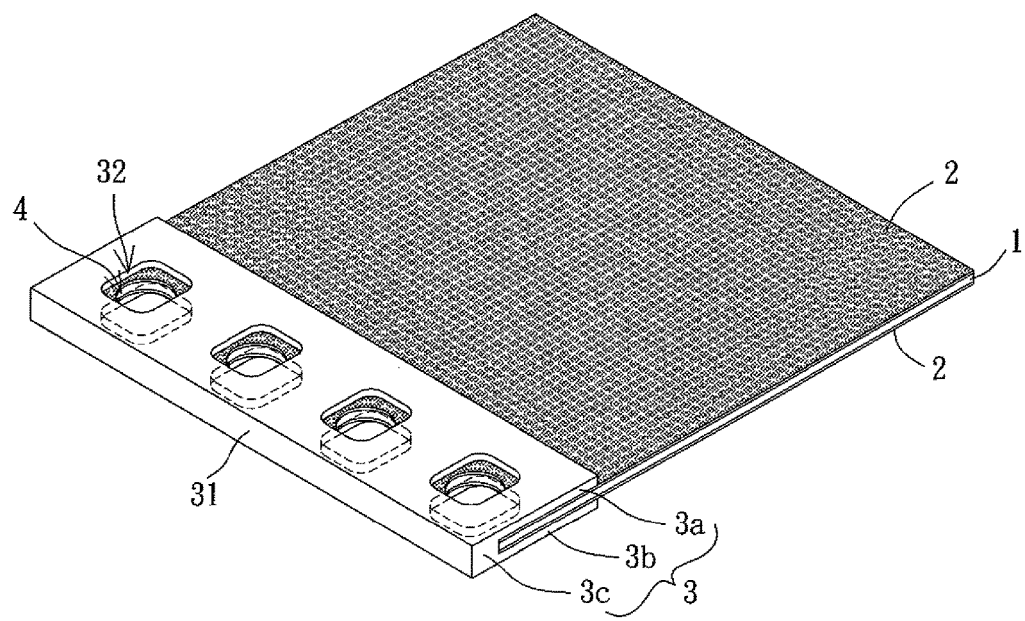
FIG. 5 shows the waterproof layer having a plurality of recesses, with an aperture formed in each of the plurality of recesses according to the watertight zipper of the first embodiment of the invention.

Next, please refer to FIG. 5, an aperture 4 is arranged in each of the plurality of recesses 32 and extends through the waterproof layer 3 and the waterproof stringer tape. The aperture 4 can be in any shape.

Figure 6:
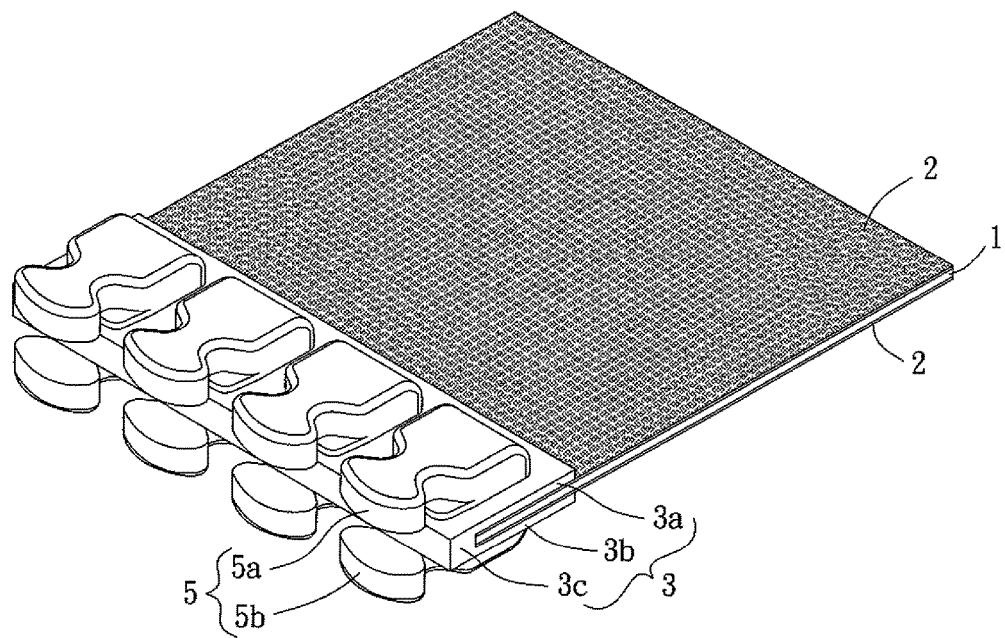
FIG. 6 shows a plurality of scoops bonded to the waterproof layer according to the watertight zipper of the first embodiment of the invention.
Figure 7:
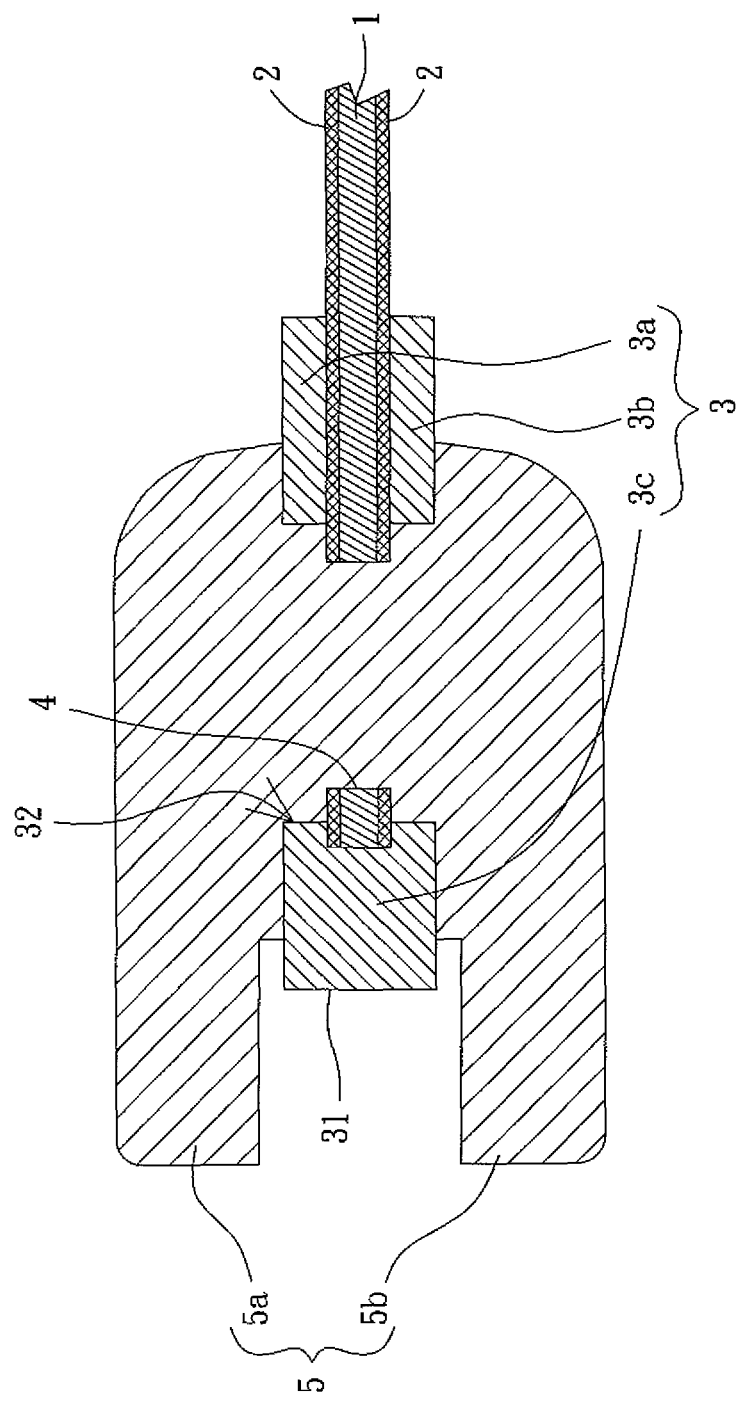
FIG. 7 is a cross sectional view of the watertight zipper of the first embodiment of the invention.

Referring to FIGS. 6 and 7, a plurality of scoops 5 is formed in the plurality of recesses 32 by injection molding. Each scoop 5 includes an upper scoop portion 5a and a lower scoop portion 5b that are interconnected via the aperture 4. Specifically, the waterproof stringer tape may be placed in another injection mold, including the waterproof layer 3 and the aperture 4. In this regard, the molten thermoplastic material is injected into the cavity of the injection mold and fills the plurality of recesses 32 and the apertures 4. After the molten thermoplastic material cools down and solidifies, the plurality of scoops 5 is formed. In this regard, the upper scoop portions 5a of the scoops 5 are arranged on the top portion 3a in intervals, and the lower scoop portions 5b of the scoops 5 are arranged on the bottom portion 3b in intervals. In FIGS. 6 and 7, the upper scoop portion 5a is fully located on the top portion 3a of the waterproof layer 3. However, the upper scoop portion 5a may be partially located on the waterproof film 2. The same can be applied to the lower scoop portions 5b.

During the formation of the plurality of scoops 5, since the molten thermoplastic material fills the plurality of recesses 32, each scoop 5 will have a non-circular part corresponding to the recess 32. Accordingly, the formed scoop 5 can be securely coupled with the waterproof stringer tape irrespectively of whether the scoop 5 is properly bonded to the waterproof layer 3 and the waterproof film 2. The positioning of the scoop 5 will not be affected by a pulling force. In another case, if a single scoop 5 is formed in more than one recess 32, it can still be ensured that the positioning of the scoop 5 is not affected by the pulling force even though the recess 32 is in a circular form.

Figure 8:
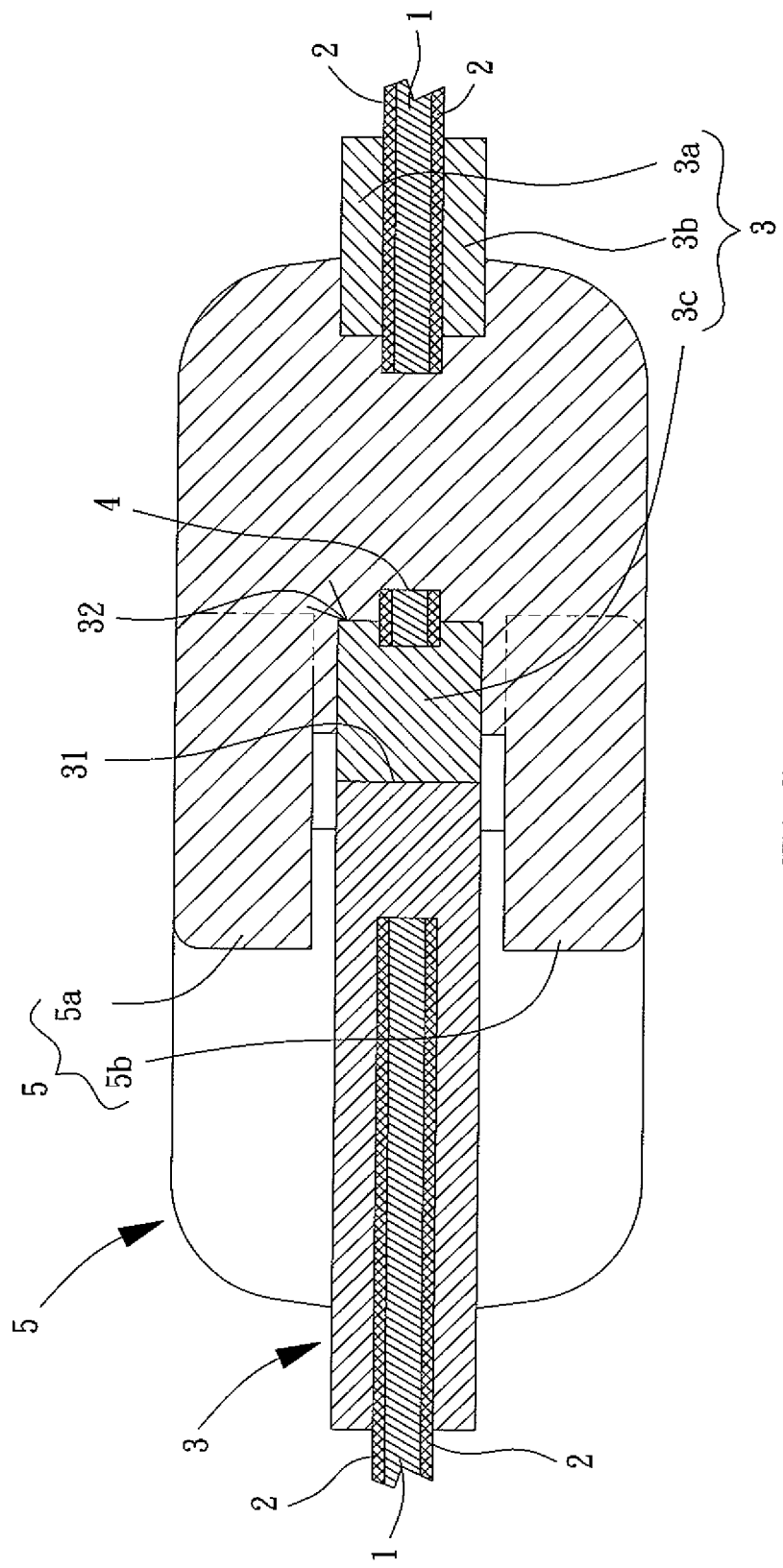
FIG. 8 is a cross sectional view of the watertight zipper of the first embodiment of the invention where the watertight zipper includes left and right scoops engaged with each other in a press manner.

Referring to FIG. 8, when the left and right scoops 5 are engaged with each other, the edges 31 of the lateral portions 3c of the left and right scoops 5 may be pressed against each other. As stated before, since the edge 31 of the lateral portion 3c is flat, the edges 31 of the lateral portions 3c of the left and right scoops 5 can be firmly pressed against each other without interstice. As a result, the liquid will not be able to leak from between the left and right scoops 5, attaining an excellent watertight effect.

Figure 9:
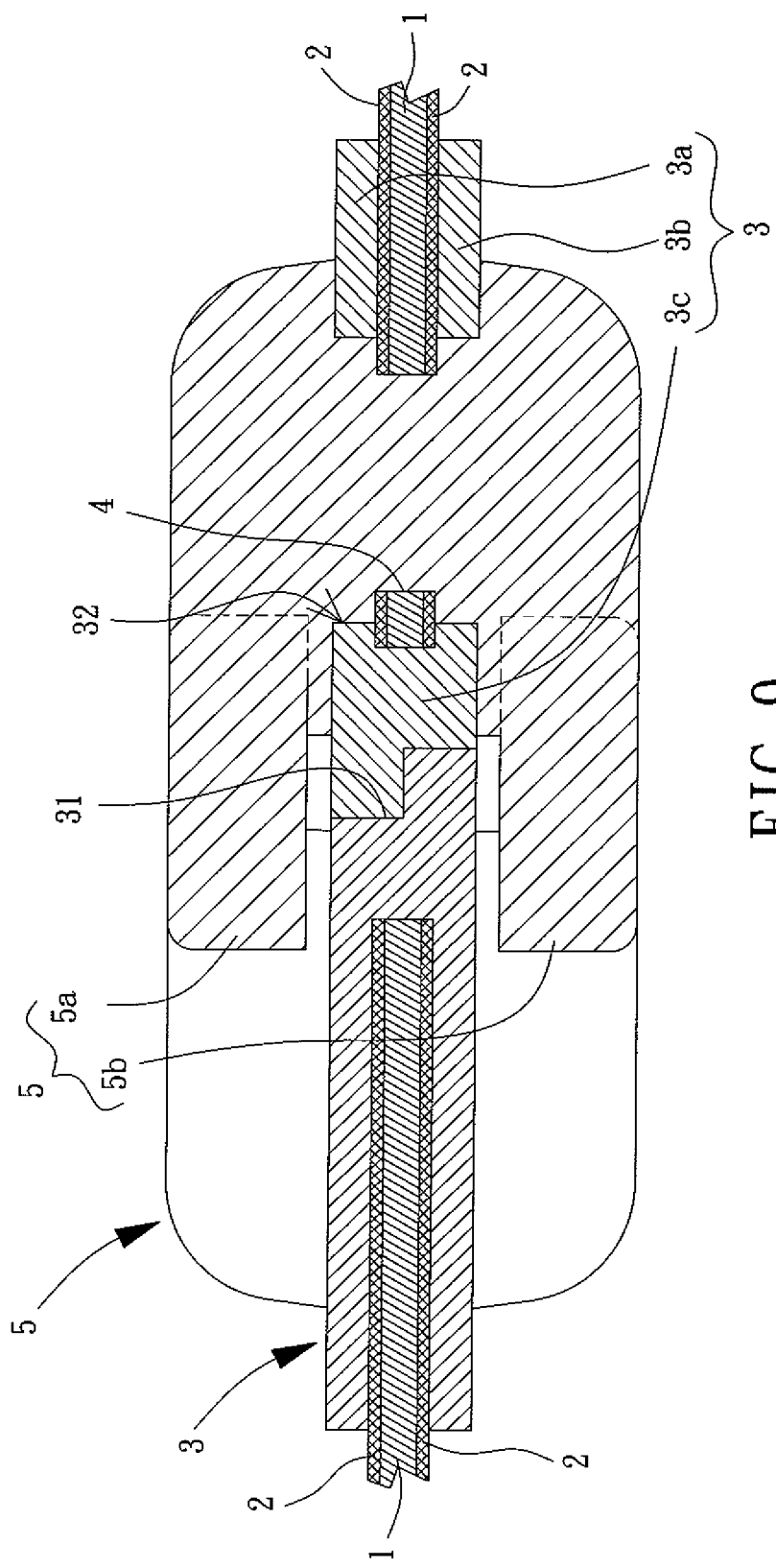
FIG. 9 is a cross sectional view of the watertight zipper of the first embodiment of the invention where the interface between the left and right scoops is in a step form and where the left and right scoops are engaged with each other in a press manner.
Figure 10:
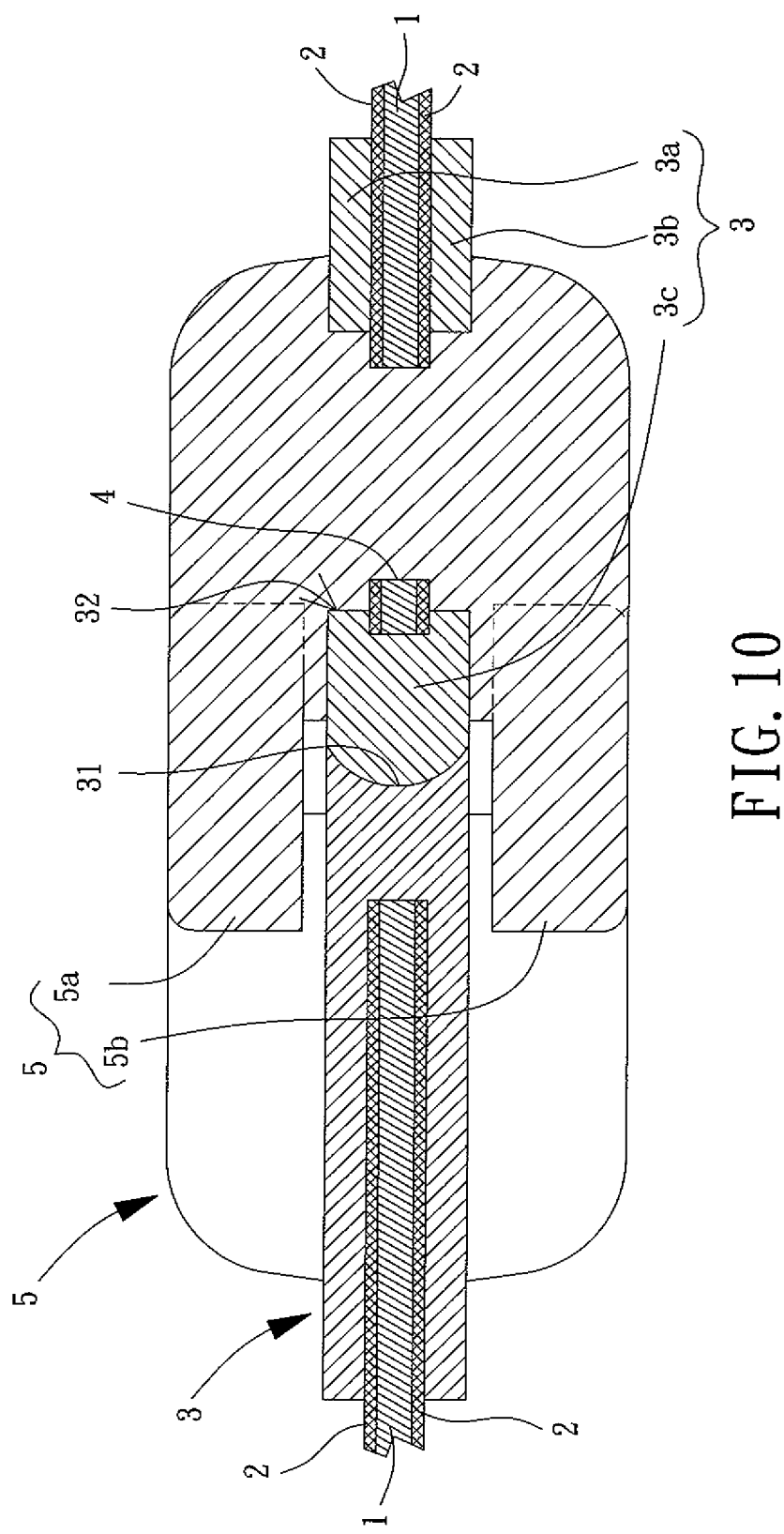
FIG. 10 is a cross sectional view of the watertight zipper of the first embodiment of the invention where the interface between the left and right scoops is in the corresponding inwardly and outwardly curved shapes and where the left and right scoops are engaged with each other in a press manner.

Referring to FIGS. 9 and 10, the edges 31 of the lateral portions 3c of the left and right scoops 5 may be designed in the shapes corresponding to each other, such as in the corresponding steps as shown in FIG. 9, or in the corresponding inwardly and outwardly curved shapes as shown in FIG. 10. In FIG. 9 where the interface between the edges 31 is in the step form having a plurality of interconnected sections extending in different directions. Since the edges 31 of the lateral portions 3c of the left and right scoops 5 are engaged with each other in a press manner, although liquid penetrates the watertight zipper from one side, the liquid cannot easily reach the other side of the watertight zipper. Therefore, the waterproof layer has a larger permissible tolerance in size.

In the following, a method for manufacturing a watertight zipper according to a second embodiment of the invention is discussed. The method in the second embodiment is substantially the same as that in the first embodiment. However, the method of the second embodiment differs from that in the first embodiment in that the tape includes a cord portion. The method for manufacturing a watertight zipper according to the second embodiment of the invention is discussed below.

Figure 11:
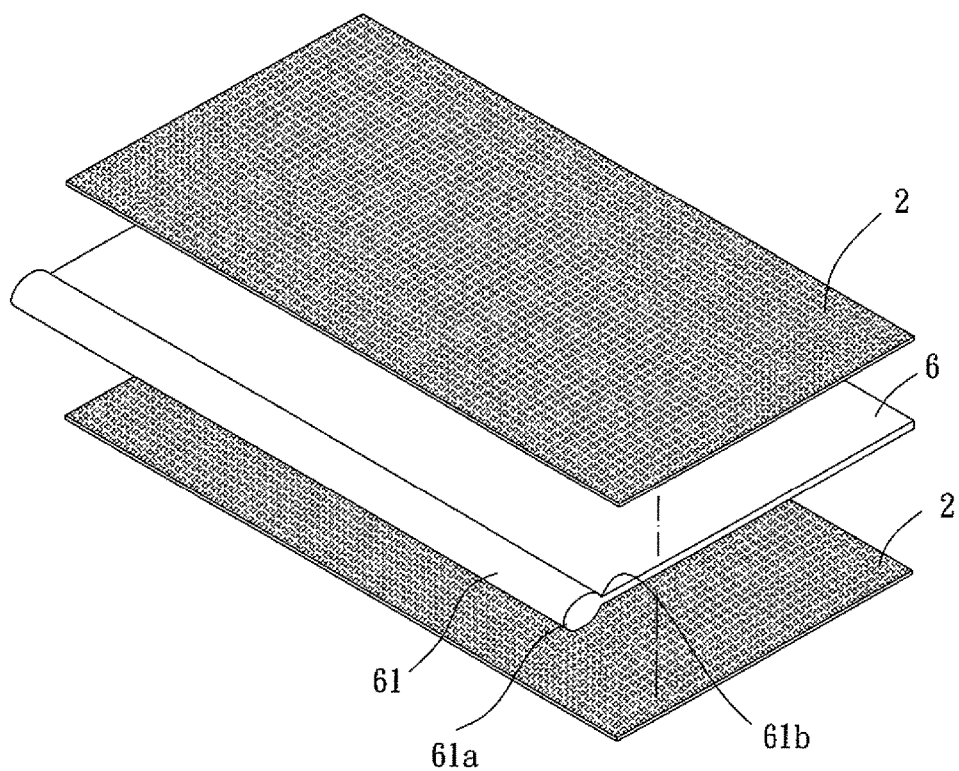
FIG. 11 shows a stringer tape to be coupled with two waterproof films at two sides thereof according to a watertight zipper of a second embodiment of the invention.

Referring to FIG. 11, a tape 6 having a cord portion 61 is prepared for manufacturing a waterproof stringer tape where liquid is not able to penetrate therethrough from one side to another side thereof. The cord portion 61 includes an outer end 61*a* and an inner end 61*b* opposite to the outer end 61*a*. The methods for manufacturing the waterproof stringer tape are not limited. For example, a waterproof film 2 may be adhered to one surface of the stringer tape 6 (preferably, both surfaces of the stringer tape 6 are provided with a waterproof film 2 as previously stated in the first embodiment). As such, the waterproof stringer tape is produced. In a preferred case, each of the upper and lower surfaces of the stringer tape 6 (as rendered according to the orientation of the watertight zipper in FIG. 13) is provided with a waterproof film 2. The cord portion 61 of the tape 6 may be designed with a waterproof function regardless of whether a waterproof gel is applied to the surface(s) of the stringer tape 6 as in an implementation, or pressure is applied to force the waterproof gel into the stringer tape 6 (to be absorbed by the stringer tape 6) as in another implementation.

Figure 12:
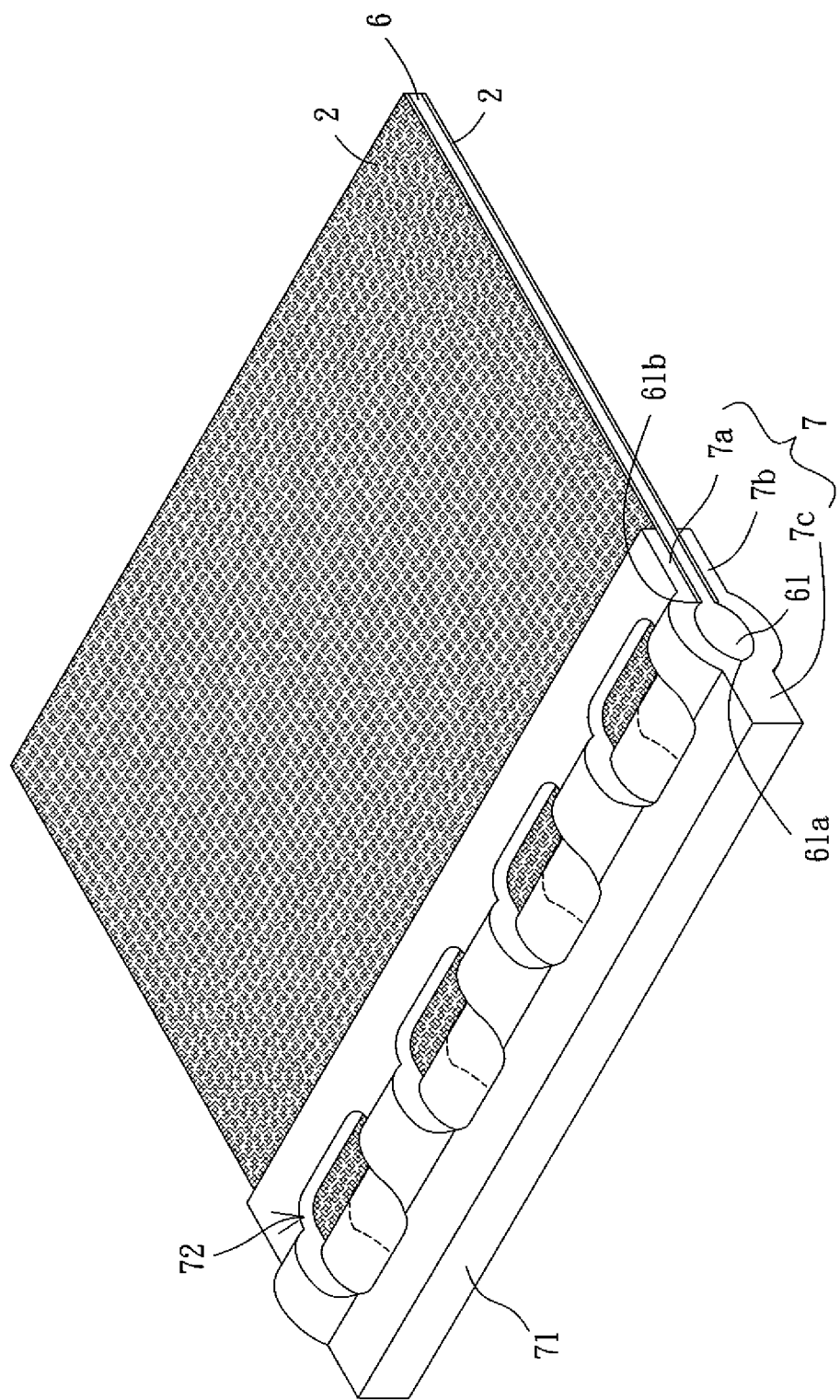
FIG. 12 shows a waterproof layer formed with the stringer tape and the two waterproof films by injection molding according to the watertight zipper of the second embodiment of the invention.

Referring to FIG. 12, a waterproof layer 7 is formed by injection molding as described in the first embodiment. The waterproof layer 7 covers one lateral edge of the waterproof stringer tape and the cord portion 61. The waterproof layer 7 includes a top portion 7*a*, a bottom portion 7*b* and a lateral portion 7*c*. The top portion 7*a* is bonded to a top face of the waterproof stringer tape, the bottom portion 7*b* is bonded to a bottom face of the waterproof stringer tape, and the lateral portion 7*c* is connected between the top portion 7*a* and the bottom portion 7*b*. The lateral portion 7*c* is located outwardly of the outer end 61*a* of the cord portion 61. Similarly, the edge 71 of the lateral portion 7*c* is designed in an even form as desired (in the embodiment, the lateral portion 7*c* is in a flat form, but this is not used to limit the invention). As such, the edge 71 of the lateral portion 7*c* will not form an irregular surface due to uneven cooling and shrinking effects.

Figure 14:
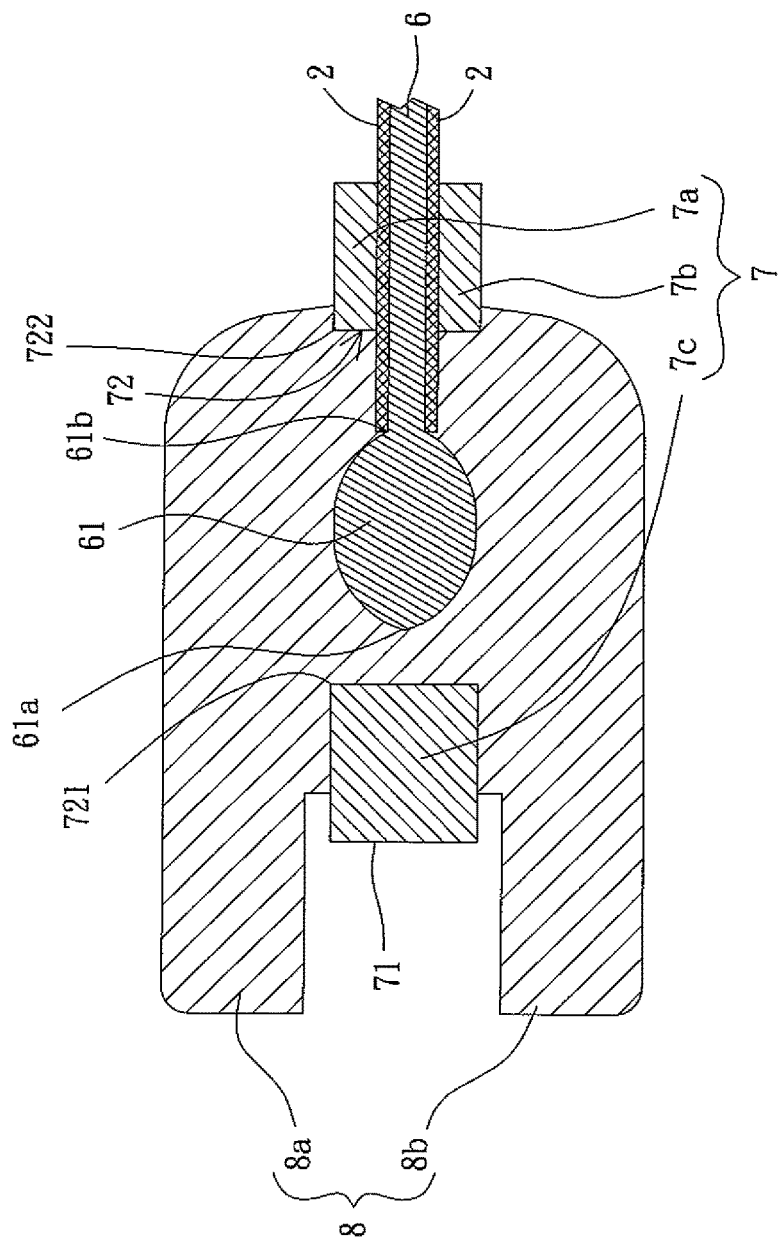
FIG. 14 is a cross sectional view of the watertight zipper of the second embodiment of the invention.

The waterproof layer 7 includes a plurality of recesses 72 arranged on the cord portion 61. The shape of each recess 72 is not limited. Referring to FIG. 14, the recess 72 includes a front end 721 extending beyond the outer end 61*a* of the cord portion 61. Thus, when one of a plurality of scoops 8 (each having an upper scoop portion 8*a* and a lower scoop portion 8*b*) is formed in the recess 72, the upper scoop portion 8*a* and the lower scoop portion 8*b* may be connected to each other through the space between the outer end 61*a* of the cord portion 61 and the front end 721 of the recess 72. The recess 72 may include a rear end 722 (as labeled in FIG. 14) extending beyond the inner end 61*b* of the cord portion 61 in order to increase the area of the scoop 8 covering the waterproof stringer tape. Thus, the engaging effect between the scoop 8 and the waterproof stringer tape is reinforced. In a case where the surface of the waterproof stringer tape is provided with a waterproof film 2, the scoop 8 may also cover the end of the waterproof film 2 to prevent the waterproof film from sticking up.

Figure 13:
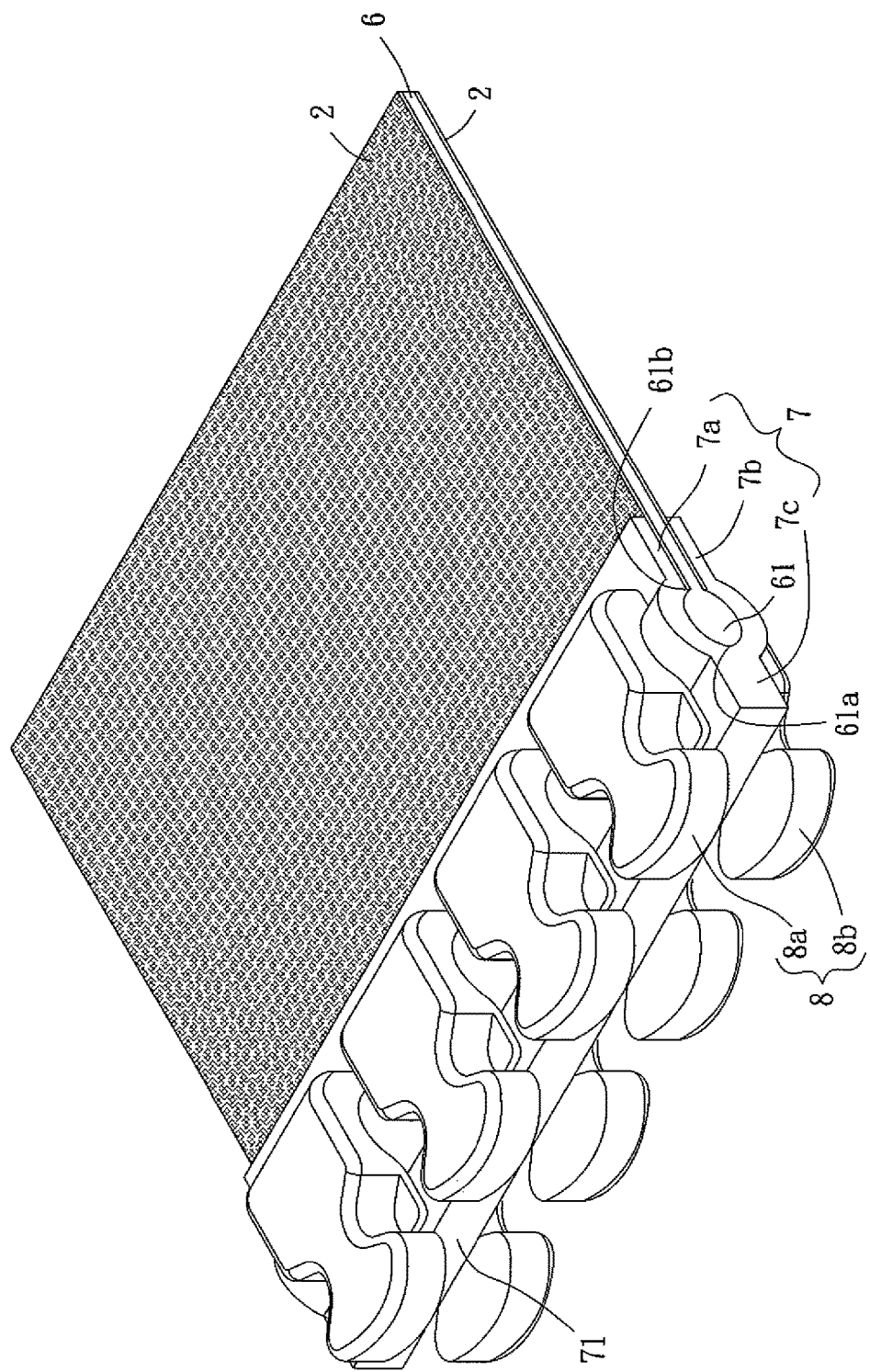
FIG. 13 shows a plurality of scoops bonded to the waterproof layer according to the watertight zipper of the second embodiment of the invention.

Referring to FIGS. 13 and 14, after the waterproof layer 7 is formed, the plurality of scoops 8 is formed in the plurality of recesses 72 by injection molding. Each scoop 8 includes an upper scoop portion 8*a* and a lower scoop portion 8*b* that are connected to each other via the recess 72 or recesses 72. Specifically, the waterproof stringer tape having the waterproof layer 7 may be placed in an injection mold. In this regard, the molten thermoplastic material is injected into the cavity of the injection mold and fills the plurality of recesses 72, to cover the cord portion 61 of the stringer tape 6. After the molten thermoplastic material cools down and solidifies, the plurality of scoops 8 is formed. In this regard, the upper scoop portions 8*a* of the plurality of scoops 8 are arranged on the top portion 7*a* in intervals, and the lower scoop portions 8*b* of the plurality of scoops 8 are arranged on the bottom portion 7*b* in intervals.

During the formation of the plurality of scoops 8, since the molten thermoplastic material flows from the outer end 61*a* of the cord portion 61 into the recess 72 and fills the recess 72, the upper scoop portion 8*a* and the lower scoop portion 8*b* are not only able to jointly cover the cord portion 61 of the tape 6, but also can be fixed to each other by the parts received in the recess 72. In this arrangement, the positioning of the plurality of scoops 8 will not be affected by a pulling force. When the left and right scoops 8 are engaged with each other, the edges 71 of the lateral portions 7*c* of the left and right scoops 8 may be pressed against each other. As stated before, since the edge 71 of the lateral portion 7*c* is flat, the edges 71 of the lateral portions 7*c* of the left and right scoops 8 can be firmly pressed against each other without interstice. As a result, the liquid will not be able to leak from between the left and right scoops 8, attaining an excellent watertight effect.

In another embodiment of the invention, an aperture can be arranged in each of the plurality of recesses 72 before the plurality of scoops 8 is arranged in the injection molding, such that the upper scoop portion 8*a* and the lower scoop portion 8*b* can have larger interconnected parts. Thus, the coupling strength of the scoop 8 is reinforced.

In summary, the method for manufacturing a watertight zipper according to the invention forms a waterproof layer of the watertight zipper in injection molding, thereby achieving the advantages of excellent processing effect, fast shaping process and precise size control. In this regard, the edge of the lateral portion of the waterproof layer is flat. As such, when two waterproof stringer tapes are combined with each other, the edges of the lateral portions of the left and right waterproof layers can be firmly pressed against each other without interstice. As a result, the liquid will not be able to leak from between the left and right scoops, attaining an excellent watertight effect.

Furthermore, the method for manufacturing a watertight zipper according to the invention ensures a secure mutual engagement between the plurality of scoops and the waterproof stringer tape by forming a waterproof layer on a tape (free of the cord portion) for providing an anti-rotation function of a plurality of scoops, or by forming a waterproof stringer tape from a tape having a cord portion. Thus, the positioning of the plurality of scoops will not be affected under a pulling force. The left and right pieces of the watertight zipper can be smoothly engaged with each other to provide a convenient operation and to improve the durability of the watertight zipper.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method for manufacturing a watertight zipper, comprising:
   producing a waterproof stringer tape comprising adhering a waterproof film to a surface of a stringer tape, and adhering another waterproof film to another surface of the stringer tape;
   injection molding a waterproof layer covering a lateral edge of the waterproof stringer tape and comprising a plurality of recesses;

forming an aperture in each of the plurality of recesses, wherein the aperture extends through the waterproof layer and the waterproof stringer tape; and injection molding a plurality of scoops in the plurality of recesses, wherein each of the plurality of scoops comprises an upper scoop portion and a lower scoop portion, and wherein the upper and lower scoop portions are interconnected via the aperture.

2. The method for manufacturing the watertight zipper as claimed in claim 1, wherein injection molding the waterproof layer comprises injection molding a top portion, a bottom portion, and a lateral portion connected between the top portion and the bottom portion, wherein the top portion is connected to a top face of the waterproof stringer tape and the upper scoop portion, wherein the bottom portion is connected to a bottom face of the waterproof stringer tape and the lower scoop portion, wherein the lateral portion comprises an edge that is in an even form, and wherein the plurality of recesses is arranged on the top portion or the bottom portion of the waterproof layer.

3. The method for manufacturing the watertight zipper as claimed in claim 2, wherein the plurality of recesses comprises a plurality of first recesses arranged on the top portion of the waterproof layer, as well as a plurality of second recesses arranged on the bottom portion of the waterproof layer, and wherein each of the plurality of first recesses is aligned with a respective one of the plurality of second recesses.

4. The method for manufacturing the watertight zipper as claimed in claim 1, further comprising:
   producing another waterproof stringer tape to be engaged with the waterproof stringer tape; and
   injection molding another waterproof layer covering a lateral edge of the other waterproof stringer tape,
   wherein both the waterproof layer and the other waterproof layer comprise a lateral portion, wherein the lateral portions of the waterproof layer and the other waterproof layer comprise two edges that are in corresponding shapes, and wherein an interface between the two edges has a plurality of interconnected sections extending in different directions.

5. A method for manufacturing a watertight zipper, comprising:
   producing a waterproof stringer tape from a tape having a cord portion;
   injection molding a waterproof layer covering a lateral edge of the waterproof stringer tape and the cord portion and comprising a plurality of recesses arranged on the cord portion, wherein the plurality of recesses extends beyond an outer end of the cord portion and an inner end of the cord portion opposite to the outer end of the cord portion, wherein the cord portion includes a face that is exposed from the plurality of recesses; and
   injection molding a plurality of scoops in the plurality of recesses, wherein each of the plurality of scoops comprises an upper scoop portion and a lower scoop portion, wherein the upper and lower scoop portions are interconnected via a respective one of the plurality of recesses, wherein the waterproof layer comprises a top portion, a bottom portion, and a lateral portion connected between the top portion and the bottom portion, wherein the top portion is connected to a top face of the waterproof stringer tape and the upper scoop portion, wherein the bottom portion is connected to a bottom face of the waterproof stringer tape and the lower scoop portion, wherein the lateral portion is located outwardly of the outer end of the cord portion to delimit a gap between the lateral portion and the outer end of the cord portion, wherein the lateral portion comprises an edge that is in an even form, wherein the plurality of recesses is arranged on the top portion or the bottom portion of the waterproof layer, and wherein each of the plurality of scoops engages with the face of the cord portion that is exposed from the plurality of recesses and fills the gap between the lateral portion and the outer end of the cord portion.

6. The method for manufacturing the watertight zipper as claimed in claim 5, further comprising forming an aperture in each of the plurality of recesses before the plurality of scoops is formed.

7. The method for manufacturing the watertight zipper as claimed in claim 5, wherein the plurality of recesses comprises a plurality of first recesses arranged on the top portion of the waterproof layer, as well as a plurality of second recesses arranged on the bottom portion of the waterproof layer, and wherein each of the plurality of first recesses is aligned with a respective one of the plurality of second recesses.

8. The method for manufacturing the watertight zipper as claimed in claim 5, wherein producing the waterproof stringer tape comprises adhering a waterproof film to a surface of a stringer tape.

9. The method for manufacturing the watertight zipper as claimed in claim 8, wherein producing the waterproof stringer tape further comprises adhering another waterproof film to another surface of the waterproof stringer tape.

10. The method for manufacturing the watertight zipper as claimed in claim 5, further comprising:
   producing another waterproof stringer tape to be engaged with the waterproof stringer tape; and
   injection molding another waterproof layer covering a lateral edge of the other waterproof stringer tape,
   wherein both the waterproof layer and the other waterproof layer comprise a lateral portion, wherein the lateral portions of the waterproof layer and the other waterproof layer comprise two edges that are in corresponding shapes, and wherein an interface between the two edges has a plurality of interconnected sections extending in different directions.

11. The method for manufacturing the watertight zipper as claimed in claim 5, wherein each of the plurality of recesses is in a non-circular form.

* * * * *